United States Patent [19]

Swisher et al.

[11] Patent Number: 4,530,968

[45] Date of Patent: Jul. 23, 1985

[54] POLYMER BLEND COMPOSITION EXHIBITING IMPACT RESISTANCE

[76] Inventors: Gregory M. Swisher; Ronald D. Mathis, both of Suite 1107, 1825 K St. NW., Washington, D.C. 20006

[21] Appl. No.: 622,312

[22] Filed: Jun. 19, 1984

[51] Int. Cl.³ .................. C08L 27/06; C08L 53/02
[52] U.S. Cl. .......................... 525/96; 525/95
[58] Field of Search ..................... 525/96, 95

[56] References Cited

U.S. PATENT DOCUMENTS

| | | | |
|---|---|---|---|
| 3,557,252 | 1/1971 | Hsieh et al. | 260/876 |
| 3,825,622 | 7/1974 | Robeson et al. | 525/96 |
| 4,048,254 | 9/1977 | Hillier et al. | 260/859 R |
| 4,096,204 | 1/1978 | Gergen et al. | 525/96 |
| 4,111,894 | 9/1978 | Gergen et al. | 525/96 |
| 4,161,472 | 7/1979 | Lehr | 525/4 |
| 4,302,555 | 11/1981 | Falk | 525/96 |
| 4,423,188 | 12/1983 | Witschard | 525/96 |

FOREIGN PATENT DOCUMENTS 0004547  10/1979  European Pat. Off. ........... 525/96

Primary Examiner—Allan M. Lieberman

[57] ABSTRACT

A composition of resinous, non-elastomeric block copolymer of a conjugated diene and a vinylarene in an amount of polyvinylchloride sufficient to provide synergistic notched Izod impact strength as determined by ASTM D-256. A method for preparing this polymeric composition.

4 Claims, No Drawings

POLYMER BLEND COMPOSITION EXHIBITING IMPACT RESISTANCE

BACKGROUND OF THE INVENTION

This invention relates to polymer composition blends. In one of its aspects this invention relates to a polymer blend exhibiting synergistic impact resistance. In another of its aspects this invention relates to the production of impact resistant blends of polymeric resin. In still another aspect of this invention it relates to the improvement of the notched Izod impact strength of resinous monovinyl-substituted aromatic compounds/conjugated diene copolymers.

The blending of polyvinylchloride (PVC) with copolymers of monovinyl-substituted aromatic compounds, herein called vinylarene, copolymerized with conjugated diene is known in the art to improve various characteristics of either the PVC or of the vinylarene/conjugated diene copolymer. It has been found, however, that the blending set out in the prior art has incorporated rubbery vinylarene/conjugated diene copolymers into blends with PVC. The rubbery characteristic of the copolymers is obtained by having a preponderance of the conjugated diene comonomer incorporated into the copolymer.

The improvement of impact strength of PVC seems to be associated in the prior art with the addition of rubbery copolymer of conjugated diene and vinylarene to the PVC. In U.S. Pat. No. 3,557,252 blends of 95 to 60 weight percent PVC and 5 to 40 weight percent rubbery butadiene/styrene copolymer exhibit impact strength that is enhanced as compared with either PVC or the rubbery copolymer taken alone. In U.S. Pat. No. 4,161,472 both a rubbery conjugated diene/vinylarene copolymer and a resinous conjugated diene/vinylarene copolymer are added to PVC to provide increase impact strength.

The present invention is interested in blends of resinous conjugated diene/vinylarene copolymer, i.e., copolymer having a preponderance for vinylarene in the copolymer, with up to an equal amount of polyvinylchloride (PVC) to provide a blend having a synergistically enhanced notched Izod impact strength.

It is therefore an object of this invention to provide a polymeric composition blend exhibiting synergistically enhanced notched Izod impact strength. It is another object of this invention to provide a method for producing this composition.

Other aspects, objects and various advantages of this invention will become apparent upon reading the specification and the appended claims.

STATEMENT OF THE INVENTION

According to this invention a blended composition is provided which contains a resinous, non-elastomeric block copolymer of a conjugated diene and vinylarene and an amount of polyvinylchloride (PVC) sufficient to provide synergistic notched Izod impact as determined by ASTM D-256.

In an embodiment of the invention a method is provided for preparing blends of polymeric material in which resinous, non-elastomeric block copolymer of conjugated diene and vinylarene is admixed with an amount of PVC sufficient to provide synergistic notched Izod impact strength as measured using ASTM D-256 (08.01).

The resinous, non-elastomeric, conjugated diene-vinylarene copolymers useful in the practice of this invention include the polymodal, radially branched block copolymers described in U.S. Pat. No. 3,639,517 and U.S. Pat. No. 4,091,053 and the linear block copolymers described in U.S. Pat. No. 4,080,407. The conjugated diene-vinylarene copolymers can also be mixtures of two or more solution polymerized copolymers such as those described in U.S. Pat. No. 4,051,197 or they can contain more than one diene comonomer as described in U.S. Pat. No. 4,120,915. All of the patents above are incorporated herein by reference.

It is generally preferred to use conjugated diene-monovinylarene copolymers prepared by employing an alkali metal-based initiator to copolymerize the monomers in a hydrocarbon diluent. The conjugated dienes generally preferred in the copolymerization are those of 4 to 12 carbon atoms per molecule with those of 4 to 8 carbon atoms per molecule being more preferred. Examples of these monomers include 1,3-butadiene, isoprene, 2,3-dimethyl-1,3-butadiene, piperylene, 3-butyl-1,3-octadiene and 2-phenyl-1,3-butadiene. The generally preferred monovinylarenes contain 8 to 20, and more preferably 8 to 12, carbon atoms per molecule. Examples include styrene, alpha-methylstyrene, 1-vinylnapthalene, 2-vinylnaphthalene and alkyl, cycloalkyl, aryl, alkaryl and arylalkyl derivatives thereof. Examples of substituted monomers include 3-methylstyrene, 4-n-propylstyrene, 4-cyclohexylstyrene, 4-dodecylstyrene, 3-ethyl-4-benzylstyrene, 4-p-tolylstyrene and 4-(4-phenyl-n-butyl)styrene. The weight ratio of conjugated diene:monovinylarene is such that the copolymer is resinous and usually will be in the range of about 45:55 to 1:99.

The most preferred conjugated diene-monovinylarene copolymers of this invention are the substantially radially branched butadiene/styrene copolymers marketed by Phillips Petroleum Company under the trademark K-Resin having a bound styrene content varying from about 60% by weight to about 90% by weight. Currently, the most preferred of these copolymers have a bound styrene content varying from about 66 to about 76 weight percent. These copolymers are commercially available both with the addition of microcrystalline wax, as useful in the present invention, and as a polymeric product to which wax has not been added.

Polyvinylchloride useful in the process of this invention is an addition polymer of the type —CH2.CHCl.CH$_2$.CHCl. Polyvinylchloride is well known in the art and is produced as a finely divided powder made by heating vinylchloride under pressure with azodiisobutyronitrile. Polymeric products made from polyvinylchloride are resistant to chemicals, microrganisms, water and ignition, but are decomposed by heat. In general, any commercially available polyvinylchloride is suitable for the present invention.

To provide the blends in the present invention PVC is combined with the resinous, non-elastomeric conjugated diene/vinylarene copolymer in a range of about 1 to about 50 weight percent PVC to about 99 to about 50 weight percent copolymer. Preferably the range of addition is about 30 to about 50 weight percent PVC to about 70 to about 50 weight percent copolymer.

The PVC can be dry mixed directly with the block copolymer or a concentrate can be made by mixing the PVC with a small amount of the block copolymer with subsequent addition of the concentrate into the bulk of the resin. If concentrates of the additives are used, a controlled ratio technique of addition is required to obtain the desired final concentration of the additives in the polymer. This ratio technique is known as a "let down" procedure.

Further processing of the compositions can produce a variety of shaped articles the most commercially important among which are industrial sheeting and polymeric piping.

est notched Izod impact strength is observed at a 60 wt.% K-Resin/40 wt.% PVC blend. The other blend properties such as tensile yield, flexural modulus, etc. show an essentially linear improvement between pure K-Resin and pure PVC compositions. Although not synergistic, as seen with the notched impact test, these property improvements can be desirable under varying use criteria.

TABLE I

| K-RESIN/PVC CONCENTRATION | 100/0 | 90/10 | 80/20 | 70/30 | 60/40 | 50/50 | 0/100 |
|---|---|---|---|---|---|---|---|
| IZOD IMPACT-NOTCHED | .32 | .38 partial | .42 partial | 2.8 | No Break | 10.5 | .19 |
| IZOD IMPACT-UNNOTCHED (ft-pounds per inch-notched or unnotched) | No Break | No Break | No Break | No Break | No Break | No Break | No Break |
| TENSILE YIELD (PSI) | 3700 | 3950 | 4025 | 4200 | 4400 | 4600 | 6900 |
| TENSILE BREAK (PSI) | 2700 | 3300 | 3500 | 3550 | 3700 | 3800 | 4750 |
| FLEXURAL MODULUS (PSI) | 224,450 | 242,920 | 244,940 | 256,135 | 261,675 | 273,325 | 342,750 |
| % ELONGATION (%) | 118 | 89 | 90 | 72 | 73 | 58 | 32 |
| GARDNER IMPACT (cm-kg) | 190 | >200 | >200 | 185 | 190 | >200 | >200 |
| HEAT DEFLECTION TEMP (°F.) | | | | | | | |
| 66 PSI | 186 | 188 | 186 | 179 | 182 | 177 | 175 |
| 264 PSI | 166 | 166 | 163 | 165 | 162 | 167 | 158 |
| VICAT (°F.) | 187 | 191 | 194 | 190 | 191 | 188 | 181 |
| SHORE D HARDNESS | 65 | 67 | 70 | 71 | 72 | 73 | 82 |

The following Example sets out a best mode of operation in the present invention. It should be taken as exemplary and not as restrictive.

EXAMPLE I

The aromatic compound/conjugated diene used in this example is that disclosed and manufactured in U.S. Pat. No. 3,639,517, included here by reference, which results in a butadiene styrene copolymer having approximately a 2500 ppm microcrystalline wax concentration, commercially available under the name of K-Resin from Phillips Petroleum Company in Bartlesville, Okla. The polyvinyl chloride resin used in the example is a pure composition of polyvinyl chloride and is commercially available under the name of 1314 PVC injection molding blend by Colorite, a division of Dart Industries of Richfield, N.J. The blends of the example range in concentration from 50 to 90 wt.% K-Resin in combination with 50 to 10 wt.% PVC. The compositions were dry blended in a dry drum tumbler such as a tumbler offered by Rainville Operations, Middlesex, N.J., for a period sufficient to result in good blending. The blended composition was then formed into test specimens under specification of the Izod impact test, ASTM method D-256, which is the industry accepted method used to test the notched Izod impact strength of polymers. As can be seen from the data in Table 1 a synergistic effect is observed in the Izod impact strength. The notched Izod impact strength of the combination of resins is greater than either resin used alone. The greatest

We claim:

1. A composition comprising (a) resinous, non-elastomeric block copolymer of a conjugated diene and a vinylarene and (b) polyvinylchloride sufficient to provide synergistic notched Izod impact strength wherein the resinous, non-elastomeric block copolymer of a conjugated diene and a vinylarene is present in an amount of about 99 to about 50 weight percent of the total composition and the polyvinylchloride is present in an amount of about 1 to about 50 weight percent of the total composition.

2. A composition of claim 1 wherein the amount of resinous, non-elastomeric block copolymer of a conjugated diene and a vinylarene is in an amount of about 70 to about 50 weight percent of the total composition and the amount of PVC is in an amount of about 30 to about 50 weight percent of the total composition.

3. A method for preparing a polymeric composition comprising, admixing resinous, non-elastomeric block copolymer of a conjugated diene and a vinylarene with an amount of polyvinylchloride sufficient to provide synergistic notched Izod impact strength as determined by ASTM D-256 said amount of polyvinylchloride in a range of about 1 to about 50 weight percent of the total composition.

4. A method of claim 3 wherein the amount of polyvinylchloride admixed into the composition is in a range of about 30 to about 50 weight percent of the total composition.

* * * * *